(12) United States Patent
Samuels et al.

(10) Patent No.: US 10,762,565 B2
(45) Date of Patent: Sep. 1, 2020

(54) SYSTEM AND METHOD FOR TRADING DISTINCT AND IDENTIFIABLE PORTIONS OF A PHYSICAL COMMODITY

(71) Applicant: Solidus Ventures GmbH, Schlieren (CH)

(72) Inventors: Eliot Samuels, New York, NY (US); Daniel Frauchiger, Thalheim (CH)

(73) Assignee: Solidus Ventures GmbH, Schlieren (CH)

( * ) Notice: Subject to any disclaimer, the term of this patent is extended or adjusted under 35 U.S.C. 154(b) by 536 days.

(21) Appl. No.: 15/482,773

(22) Filed: Apr. 9, 2017

(65) Prior Publication Data

US 2017/0213286 A1 Jul. 27, 2017

Related U.S. Application Data

(63) Continuation of application No. PCT/US2015/054817, filed on Oct. 9, 2015.
(Continued)

(51) Int. Cl.
*G06Q 40/00* (2012.01)
*G06Q 40/04* (2012.01)
(Continued)

(52) U.S. Cl.
CPC .............. *G06Q 40/04* (2013.01); *G06Q 30/06* (2013.01); *G06T 7/11* (2017.01); *G06Q 30/0613* (2013.01)

(58) Field of Classification Search
CPC .................................. G06Q 40/04; G06T 7/11
See application file for complete search history.

(56) References Cited

U.S. PATENT DOCUMENTS

| 7,206,763 B2 | 4/2007 | Turk |
| 7,885,865 B2 | 2/2011 | Benson et al. |
| (Continued) | | |

FOREIGN PATENT DOCUMENTS

| CN | 1417710 A | 5/2003 |
| CN | 101075334 A | 11/2007 |
| (Continued) | | |

OTHER PUBLICATIONS

Anonymous, "Unallocated Gold," https://www/bullionvault.com/gold-guide/unallocated-gold, (Year: 2005).*
(Continued)

*Primary Examiner* — Alexander G Kalinowski
*Assistant Examiner* — William B. Bunker
(74) *Attorney, Agent, or Firm* — RMCK Law Group, PLC

(57) ABSTRACT

A method can include obtaining a physical commodity that is divided into one or more physical units. The method can further include storing the physical commodity in a secure vault. Additionally, a map can be utilized to subdivide each of the one or more physical units into a plurality of segments. Each of the plurality of segments can be tangible portions of the physical unit that are distinct and identifiable. Subdividing each of the one or more physical units can render the physical units unaltered. Further, the map can be utilized to assign ownership of the plurality of segments to one or more owner users. The method can additionally include receiving an instruction to transfer ownership of a particular segment of the plurality of segments from a particular owner user to a buying user, and assigning in the map ownership of the particular segment to the buying user.

10 Claims, 6 Drawing Sheets

Related U.S. Application Data

(60) Provisional application No. 62/062,188, filed on Oct. 10, 2014.

(51) Int. Cl.
*G06Q 30/06* (2012.01)
*G06T 7/11* (2017.01)

(56) References Cited

U.S. PATENT DOCUMENTS

| | | | | |
|---|---|---|---|---|
| 9,558,544 | B2* | 1/2017 | Truong | G07D 5/005 |
| 2002/0087428 | A1* | 7/2002 | Koide | G06Q 20/10 |
| | | | | 705/26.1 |
| 2002/0128742 | A1* | 9/2002 | Zieverink | B44B 1/006 |
| | | | | 700/159 |
| 2003/0191708 | A1* | 10/2003 | Turk | G06Q 20/02 |
| | | | | 705/39 |
| 2005/0256726 | A1 | 11/2005 | Benson et al. | |
| 2007/0244812 | A1* | 10/2007 | Turk | G06Q 20/02 |
| | | | | 705/39 |
| 2010/0042535 | A1* | 2/2010 | Stone | G06Q 20/10 |
| | | | | 705/39 |
| 2011/0022542 | A1* | 1/2011 | Lutnick | G06Q 30/0278 |
| | | | | 705/36 R |
| 2012/0066097 | A1 | 3/2012 | Amos | |
| 2013/0315437 | A1* | 11/2013 | Kerschner | G06K 9/6202 |
| | | | | 382/100 |

FOREIGN PATENT DOCUMENTS

| | | | | |
|---|---|---|---|---|
| JP | 2003345993 | * | 12/2003 | G06Q 40/04 |
| WO | WO-2011013942 A2 | * | 2/2011 | G07F 9/026 |
| WO | WO-2012145842 A1 | * | 11/2012 | G06T 7/0004 |

OTHER PUBLICATIONS

PCT International Search Report and Written Opinion dated Dec. 29, 2015 for PCT International Application No. PCT/US2015/054817, 9 pages.

Chinese Search Report dated Jan. 15, 2020 for Chinese Application No. 201580066218.X, 3 pages.

* cited by examiner

SYSTEM AND METHOD FOR TRADING DISTINCT AND IDENTIFIABLE PORTIONS OF A PHYSICAL COMMODITY

CROSS-REFERENCE TO RELATED APPLICATIONS

This application is a continuation of PCT International Application No. PCT/US2015/054817, filed on Oct. 9, 2015, which claims the benefit of U.S. Provisional Application No. 62/062,188, filed on Oct. 10, 2014. The disclosure of each of the above applications is incorporated herein by reference in their entireties.

FIELD

The present disclosure relates to commodity trading and distribution, and, more specifically, to a system and method for trading distinct and identifiable portions of a physical commodity without altering the physical condition of the commodity.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Physical commodities, such as precious metals, are mainly used for fabrication, for consumption, and as a store of value. In the present day, however, the historic functions of physical commodities as a medium of exchange and unit of measurement of the value of goods and services have become largely replaced by deposit currencies. Such deposit currencies have certain advantages over physical commodities, e.g., deposit currencies may be less prone to theft, easier to transport, and have a lower risk of forgery and/or debasement. Nonetheless, some investors choose to own physical commodities as a hedge against volatility in stock markets, since over time they have produced similar returns as major stock indices without being correlated with them, as well as for other reasons. Thus, there is a need for a system and method that reduces or eliminates the disadvantages, while maintaining the advantages, of trading and storing physical commodities.

SUMMARY

In some implementations of the present disclosure, a method of transferring ownership of a portion of a physical commodity is disclosed. The method can include obtaining a physical commodity that is divided into one or more physical units. The method can further include storing the physical commodity in a secure vault. Additionally, a map can be utilized to subdivide each of the one or more physical units into a plurality of segments. Each of the plurality of segments can be tangible portions of the physical unit that are distinct and identifiable. Subdividing each of the one or more physical units can render the physical units unaltered. Further, the map can be utilized to assign ownership of the plurality of segments to one or more owner users. The method can additionally include receiving an instruction to transfer ownership of a particular segment of the plurality of segments from a particular owner user to a buying user, and assigning in the map ownership of the particular segment to the buying user.

In further implementations of the present disclosure, a computing device for transferring ownership of a portion of a physical commodity is disclosed. The computing device can include one or more processors and a non-transitory, computer readable medium storing instructions that, when executed by the one or more processors, cause the computing device to perform operations. The operations can include utilizing a map that subdivides each of one or more physical units of a physical commodity into a plurality of segments. Each of the plurality of segments can be tangible portions of the physical unit that are distinct and identifiable. Subdividing each of the one or more physical units can render the physical units unaltered. Further, the map can be utilized to assign ownership of the plurality of segments to one or more owner users. The operations can further include receiving an instruction to transfer ownership of a particular segment of the plurality of segments from a particular owner user to a buying user, and assigning in the map ownership of the particular segment to the buying user.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
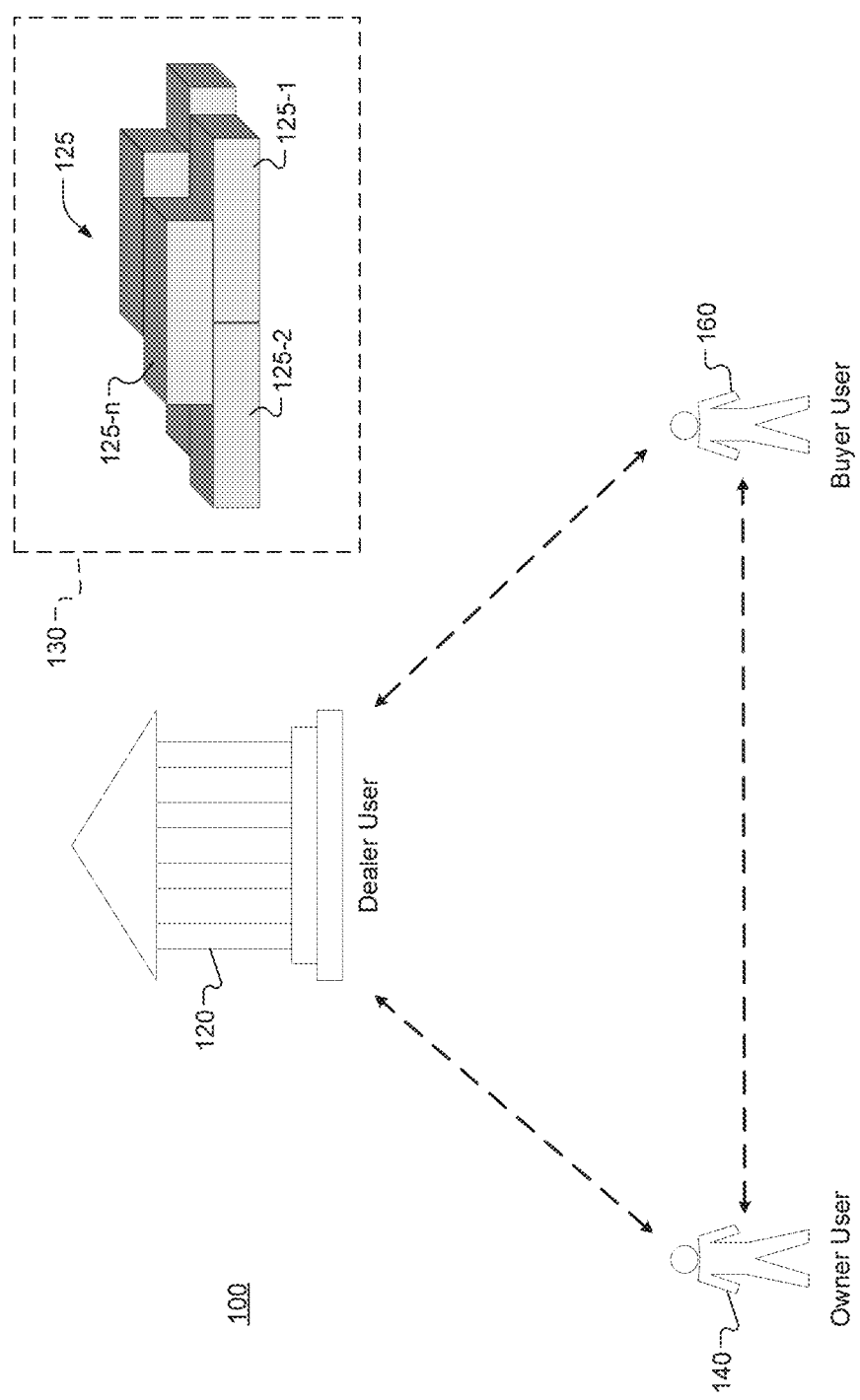
FIG. 1 is a diagram of an example system for trading distinct and identifiable portions of a physical commodity according to some implementations of the present disclosure.

Metals, and especially precious metals, were among the first universally successful commodities to be used as a unit of measurement, a medium of exchange, and a store of economic value. These metals were circulated initially in the form of irregular pieces of metal, and later as bars or coins that had standardized shapes, weights, and values. Standardized units of commodities such as metal coins had obvious benefits, which resulted in precious metals persisting as the most popular universally-accepted commodities to be used as store of value. Simply put, their relative scarcity, purity, divisibility/multipliability, portability, and resistance to damage made such currency systems more sustainable in the long term. The Lydians and the Chinese were the earliest societies to develop metal coinage, and did so independently at around the same time in the 7th-8th centuries B.C. Their innovation catalyzed the use of metal coinage in other societies they touched in the Far East, Near East, and Mediterranean. As time progressed, virtually all societies came to use coinage made of gold, silver, and base metals such as bronze for saving, exchange, and measurement.

The practice of minting precious metal bars and coins that have monetary roles continues through today. There are, however, some disadvantages when trading precious metals or otherwise using precious metals as a currency. As mentioned above, physical units of physical commodities (such as precious metals) may be more prone to theft than other options, and can be impractical to transport and use in everyday commerce. Furthermore, physical units of such commodities may be at a higher risk of forgery and/or debasement when compared to other options. Thus, businesses and other entities have attempted to provide the benefits of owning and trading physical commodities, while eliminating or reducing these and other disadvantages.

Precious metal exchange-traded funds ("ETFs") have emerged as a popular alternative to direct ownership of some commodities. An investor in a precious metal ETF does not own any physical metal, but instead owns units of ownership in the ETF that, ultimately, owns the commodities, in this case, precious metals. Precious metal ETFs are usually funds or trusts that own physical precious metals and allow investors to buy shares or units in the fund or trust. In practice, the share or unit prices of such ETFs have proven to closely correlate to spot prices of the underlying precious metals. Thus, such ETFs have allowed investors to gain exposure to physical commodities, while lowering the transaction costs associated with more traditional commodity purchasing and without requiring investors to buy or store actual physical bars, coins, or other physical units of a commodity.

ETFs, and especially precious metal ETFs, are perceived to have numerous disadvantages compared to physical metals. For example, in some jurisdictions ETFs are considered securities, funds, or other financial instruments that require anyone who sells them to the public to possess special licenses, which are difficult and costly to obtain and maintain. In addition, in certain jurisdictions owning some ETFs has adverse tax or other regulatory consequences on the ultimate buyer of the ETF. Aside from regulation and taxation, many investors shun ETFs in favor of physical commodity investing in order to minimize their exposure to counterparty credit, operational, and other risks sometimes associated with ETFs.

Another way to invest in some commodities, namely in metals, is to utilize metal accounts, which allow investors to pay a vault company, a commodities trading company, a financial company, or other institution to store metals on behalf of the investor. Metal accounts can be classified into three groups: (i) allocated accounts, (ii) pool allocated accounts, and (iii) pool unallocated accounts.

In allocated accounts, investors/account holders own specific commodity units in a commercial vault for a time and size-based fee. In some cases, the holdings of allocated accounts can be withdrawn for a fee. However, allocated accounts have numerous disadvantages. For example, administrators of allocated accounts frequently impose large minimum investment requirements that are dictated by the size of the smallest practically available commodity units and by business reasons. Furthermore, in order for an investor/account holder to trade or transfer ownership of the assets in his/her account to a third party, the third party must be willing to receive a portion of the holdings in whatever physical condition those holdings are stored (a specific coin or group of coins, a bar or group of bars, etc.). Thus, the potential values of the physical commodity to be purchased by a third party purchaser will be dictated by the size of the discrete physical unit(s) of the physical commodity available, which places significant limitations on account holders' ability to transfer ownership of assets held in a metal account to third parties.

In pool allocated accounts, investors/account holders own a specific amount of a commodity, measured in some form of unit of measurement, e.g., precious metals may be measured in ounces or grams. Institutions that manage such pool allocated accounts maintain a sufficient amount of the physical commodity to cover 100% of the outstanding claims of the account holders in a storage facility, such as a vault, and cannot use the physical commodity for its own purposes (e.g., selling or leasing the commodity). Additionally, the physical commodity may also be required to be segregated from other items in the storage facility. Withdrawals from pool allocated accounts are typically made with cash. However, an account holder may be permitted to withdraw actual physical commodities, but only in the event that the value of such a withdrawal is greater than or equal to the value of the smallest discrete physical unit of the physical commodity available. Furthermore, pool allocated accounts have numerous other disadvantages. In some jurisdictions, pool allocated accounts are subject to more adverse regulatory or tax treatment than physical commodities or simple allocated accounts where specific commodity units are being stored for clients. In addition, because there is no strict accountability about the specific commodity units that must be stored to back the pool allocated accounts, it is easier for an institution that maintains such accounts to misappropriate some portion of the commodities and to use them for its own purposes, which, if not remedied, can lead to a temporary or permanent loss of value for the account holders.

A pool unallocated account is similar to a pool allocated account, with the significant difference that the holding institution does not have to maintain a sufficient amount of the physical commodity to cover 100% of the outstanding Claims and can use the physical commodity for its own purposes (e.g., selling or leasing the physical commodity). Thus, in addition to having all of the disadvantages of pool allocated accounts, pool unallocated accounts can be considered to be fundamentally an unsecured liability of the institution that maintains the account, and account holders of such pool unallocated accounts cannot accurately be described as owning a physical commodity and are exposed to substantial counterparty credit and other risks.

While the accounts described above may offer advantages similar to owning a physical commodity, they have numerous disadvantages, such as those described above. The most significant disadvantages include lofty minimum deposits (typically thousands and sometimes millions of dollars) and substantial barriers to transferability. Additionally, in most jurisdictions there are significant differences between the governmental regulations applicable to the trading of physical commodities and trading of accounts, funds, or other interests in companies that own physical commodities (e.g., ETFs). In yet another example, there are in some jurisdictions different securities and tax regulations associated with marketing/owning/transferring non-physical and non-specific commodity interests that are generally adverse to investors, as well as to dealers, marketers and other providers of such interests. Finally, owners of interests in pool accounts, especially pool unallocated accounts, are exposed to significant counterparty risks which do not apply to owners of physical commodities. For these and other reasons, there remains a need for an improved entity/mechanism/etc. for owning and/or trading strictly specific and physical commodities.

The present disclosure describes a system and method that addresses the issues described above, while combining the above mentioned advantages of owning and trading physical commodities in their role to store value and as a medium of exchange. Further, the system and method can enable the use of a specific physical commodity (e.g., precious metal)—instead of some institution's liability (accounts, deposit currencies, etc.)—as a unit of exchange for economic transactions. The techniques of the present disclosure can also offer the advantages of allocated accounts, as the physical commodity can be safely stored in a storage facility (e.g., a vault or the like) and does not have to be physically transported to settle a transaction. Additionally, the system and method of the present disclosure also benefits from many of the safety and efficiency benefits of deposit currency without forcing users to cede the benefits of physical commodity ownership.

The present disclosure achieves these goals through the use of allocated commodity segments, where specific portions of physical units of a commodity (e.g., specific segments of precious metal ingots or bars) are unambiguously allocated to specific users/investors. Each segment is a tangible portion of a physical commodity unit that is identifiable and distinct from all other such segments. Furthermore, while the segments may be separately allocated to different users, the segments need not be physically separated from each other, thereby rendering their associated physical unit(s) unaltered. Further details of the present disclosure are set forth below.

In order to simplify the description, certain terminology will be utilized with the present disclosure. Accordingly, a brief description of such terminology may be beneficial to assist in understanding the present disclosure. It should be appreciated, however, that this brief description of terminology is meant merely to assist the reader and is not intended to be limiting in anyway.

The term "dealer user" will be used to describe the entity that performs certain elements of the present disclosure related to obtaining, storing and/or assigning ownership of a physically commodity. The term "owner user" will be used to describe the entity that owns one or more segments of a physical commodity that are held by, or in trust for, a dealer user. The term "buying user" will be used to describe the entity that is purchasing or otherwise obtaining ownership of one or more segments of a physical commodity from the owner user.

It should be appreciated that these terms are merely labels, and are somewhat amorphous. For example, in certain circumstances an individual person may act as the described "dealer user," while an actual dealer (a commodities trading firm, a dealer in coins or other collectibles, a financial firm, etc.) may act as the "owner user" or "buying user" described. Additionally, one or more separate entities may act in concert to act as a single "dealer user," "owner user," and/or "buyer user" as described. Furthermore, in some situations an entity or entities may act as more than one of, or all three of, a "dealer user," "owner user," and/or "buyer user" as described, depending on the specific activities analyzed by, and the perspective of, the viewer.

Referring now to FIG. 1, an example system 100 for trading distinct and identifiable portions of a physical commodity according to some implementations of the present disclosure is illustrated. The illustrated system 100 includes a dealer user 120, an owner user 140, and a buyer user 160. Additionally, a physical commodity 125 is illustrated as being physically located in a vault 130, which may or not be in the physical custody of the dealer user 120. The physical commodity 125 can take any form of tangible commodity that has economic value, e.g., a precious metal. The physical commodity 125 can be divided into one or more discrete physical units 125-1, 125-2, . . . 125-n.

As indicated by the dashed lines, various communications, instructions, financial instruments, physical commodities, etc. may be freely exchanged between these entities. At least some of the elements exchanged between these entities must be communicated, received, and/or generated by or with the assistance of one or more computing devices, as further described below. Accordingly, each particular entity of the dealer user 120, owner user 140, and buyer user 160 as illustrated in FIG. 1 can include at least one computing device associated with that particular entity. Furthermore, the dashed lines should be interpreted to include both direct exchanges between entities, as well as indirect exchanges between entities, such as electronic communications routed through intermediate entities and mechanisms (such as through one or more server computing devices over a computer network, e.g., the Internet).

Figure 2:
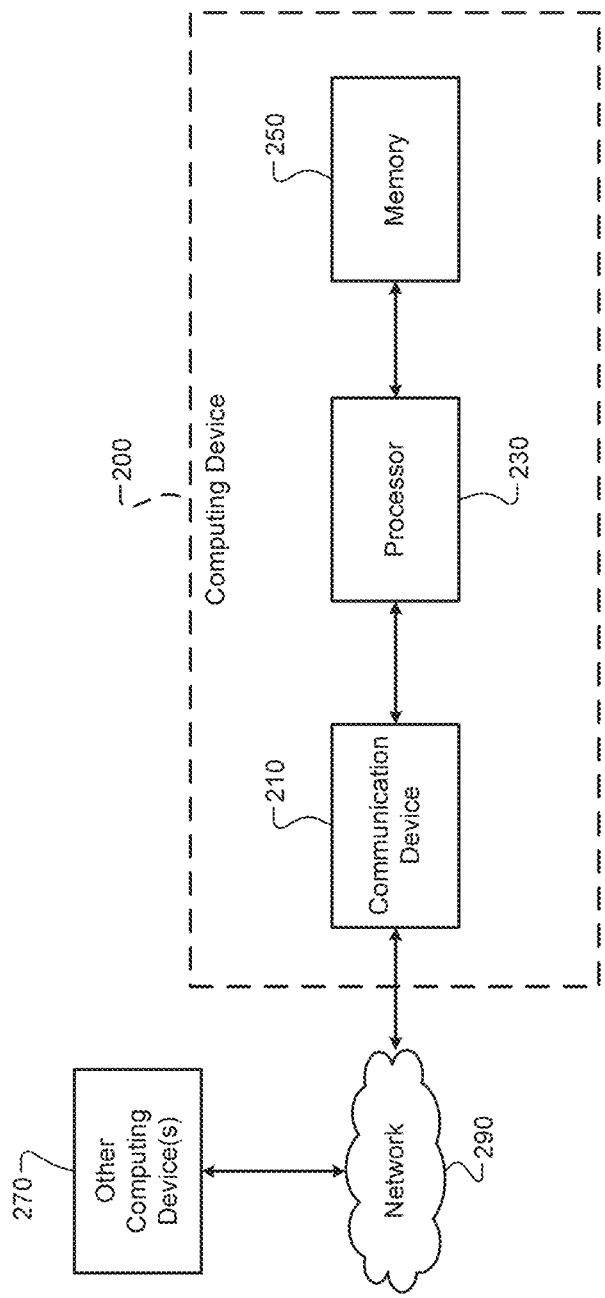
FIG. 2 is a functional block diagram of an example computing device used in conjunction with the example system of FIG. 1.

Referring now to FIG. 2, a functional block diagram of an example computing device 200 is illustrated. The computing device 20 can include a communication device 210, a processor 230, and a memory 250. The communication device 210 can include any suitable communication components (e.g., a transceiver) for communication with other computing devices 270, directly and/or via a network 290. The processor 230 can control operation of the computing device 200 and can implement at least a portion of the elements of the described methods. The term "processor" as used herein can refer to both a single processor and multiple processors operating in a parallel or distributed architecture. The memory 250 can be any suitable storage medium (flash, hard disk, etc.) for storing information at the computing device 200. The computing device 200 can receive communications and data from the other computing devices 270. Further, although not illustrated in FIG. 2, the computing device can also receive inputs from entities (such as the described "dealer user," "owner user," and "buyer user") through various interfaces.

As an initial matter, the physical commodity 125 is obtained by the dealer user 120, and stored in a secure vault 130 associated therewith. In some embodiments, storing the physical commodity 125 in a secure vault 130 can include transferring the physical commodity 125 to a third party vault owner. For example only, a dealer user 120 can obtain ownership of the physical commodity 125 from a third party (e.g., a mine operator, a refiner, a commodity trader, a financial firm, or even another dealer user), whereby the physical commodity 125 is physically transferred to the storage vault 130 of another third party. In some situations, the same third party can be the transferor and the custodian of the storage vault 130, such that obtaining the physical commodity 125 comprises obtaining ownership of the physical commodity 125 without actually physically transferring the physical commodity 125. In other implementations, obtaining the physical commodity 125 comprises obtaining ownership of the physical commodity 125 where the physical commodity 125 is in the physical custody of a third party that is not a party to the transaction.

Figure 3:
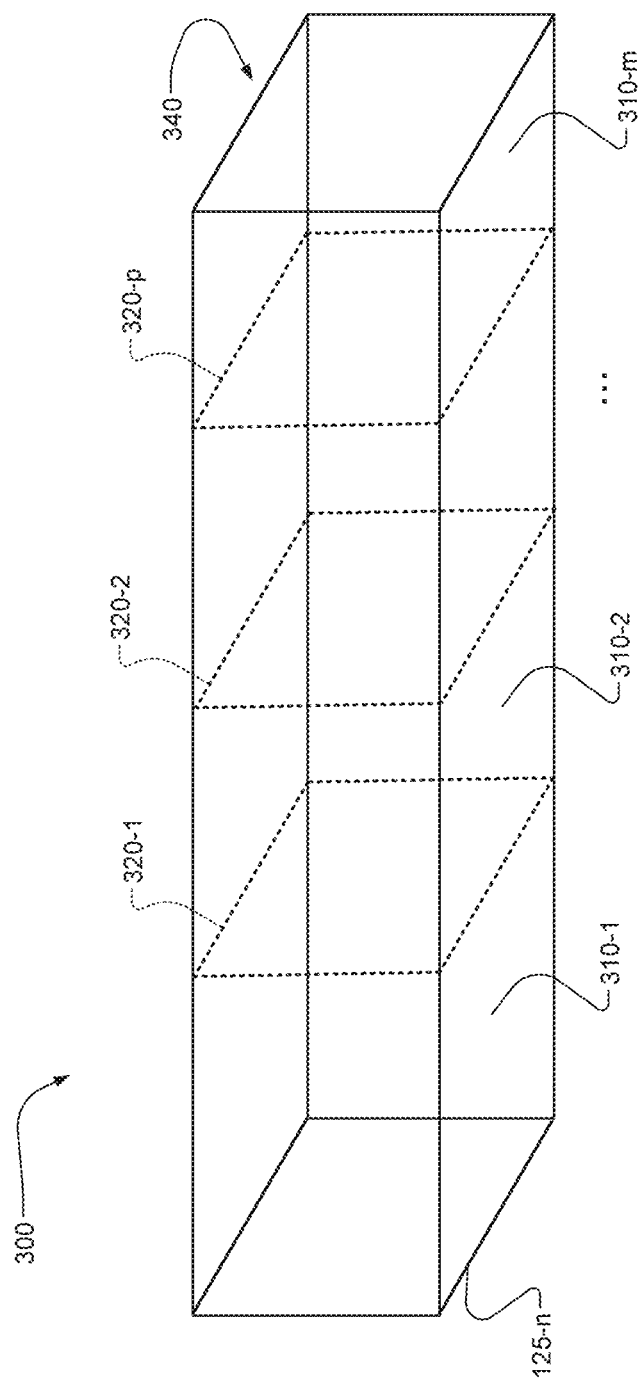
FIG. 3 is an example image of an example physical unit of a physical commodity according to some implementations of the present disclosure.

Referring now to FIG. 3, an example image 300 of an example physical unit 125-*n* of the physical commodity 125 is illustrated. The physical unit 125-*n* is subdivided into a plurality of segments 310-1, 310-2, . . . 310-*m* (referred to herein individually and collectively as "segment(s) 310"). Each of the segments 310 is a tangible portion of the physical unit 125-*n* that is distinct and identifiable from all other segments 310. The combination of all of the segments 310 together comprises the physical unit 125-*n*. Further, the subdivision of the physical unit 300 into the plurality of segments 310 is not a physical separation of the segments 310, but instead a mapping of coordinates in a three-dimensional description or other representation of the physical unit 125-*n* that describes each and every segment 310 while leaving the physical unit 125-*n* unaltered.

In some implementations, segments 310 can be described/defined by one or more segment planes 320-1, 320-2, . . . 320-*p* (referred to herein individually and collectively as "segment plane(s) 320"). A segment 310 can be defined to be a portion of the physical unit 125-*n* between two segment planes 320, or between a physical end 340 of the physical unit 125-*n* and a segment plane 320. It should be appreciated that any manner of defining segments 310 of a physical unit 125-*n* can be utilized with the system and method of the present disclosure. In other examples, a segment 310 can be described as a portion of the physical unit 125-*n* defined by a mathematical formula, and/or determined (specifically including determining by estimating with a high-degree of accuracy) from a scan or other imaging technique.

Figure 4:
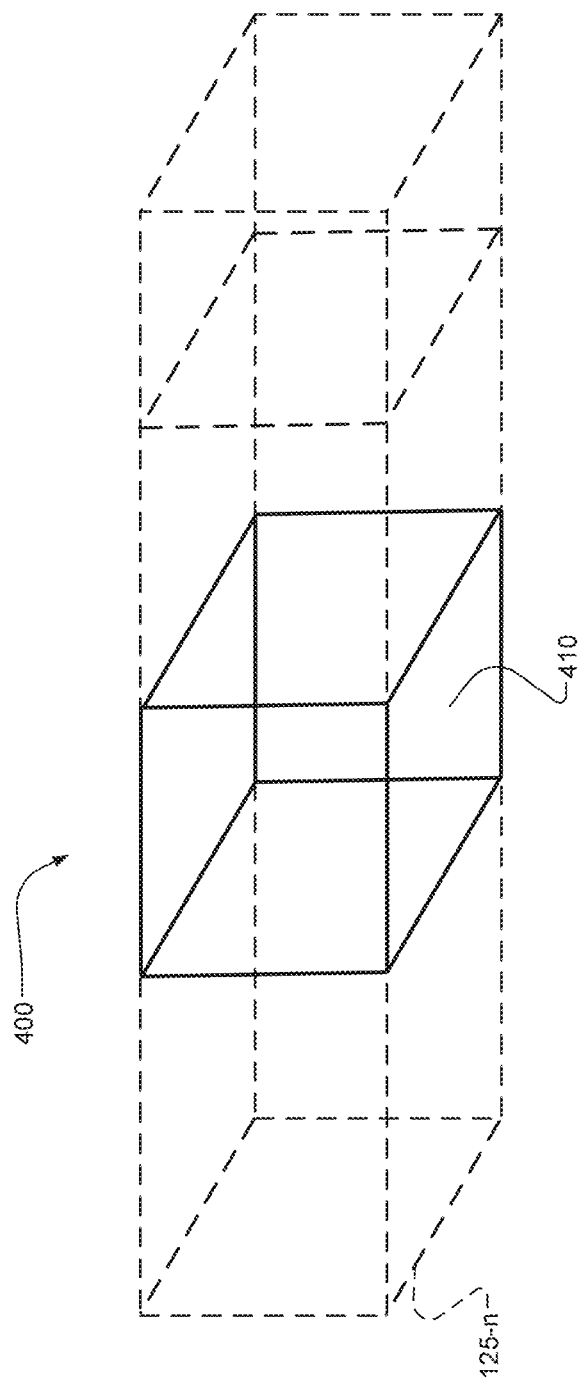
FIG. 4 is an example representation of a segment of a physical unit of a physical commodity according to some implementations of the present disclosure.

In some implementations, the dealer user 120 can obtain an image of each of the physical units 125 in the secure vault 130, e.g., from an imaging device such as a three-dimensional scanning device or other hardware computing device. The term "image" as used herein with respect to "an image of each of the physical units 125" is intended to include not only an actual image (such as obtained from an imaging device, e.g., camera or the like) of a physical unit 125, but also any representation of the physical unit 125. From the obtained images, the dealer user 120 can generate, at a computing device such as computing device 200 described above, a representation 400 (see FIG. 4) for each of the plurality of segments 310. Each representation 400 can be associated with one 410 of the plurality of segments 310 and representative of its associated segments 410. It should be appreciated that, while FIG. 4 shows the outline of the remainder of the physical unit 125-*n* in phantom outline (dashed lines), the representation 400 can, but does not necessarily, include a phantom outline as shown.

The generation of the representation 400 for each of the plurality of segments 310 can provide a number of benefits. For example, some individuals (such as the owner user 140 and the buyer user 160) may feel more comfortable and/or secure in the feeling of ownership of a segment 310 of a physical unit 125-*n* of a physical commodity 125 when they can actually "see" their segment 310 separate and apart from the other segments 310 in the physical unit 125-*n*. Such a "seeing-is-believing" may make the ownership of the segment 310 of the physical commodity 125 more tangible and "real" to certain individuals, while not actually requiring the physical separation of their segment 310 from other segments 310 with its associated cost and difficulty. Additionally, the representation 400 may constitute evidence sufficient to prove to a regulatory/tax authority that an owner user 140 actually owns a tangible, distinct, and identifiable portion of a physical commodity 125, and not merely a partial interest in an undivided physical commodity 125. Thus, in some embodiments the dealer user 120 can output, utilizing a computing device (such as computing device 200) associated with the dealer user 120, the representation 400 associated with a particular segment to at least one of the owner user 140 and the buying user 160.

Figure 5:
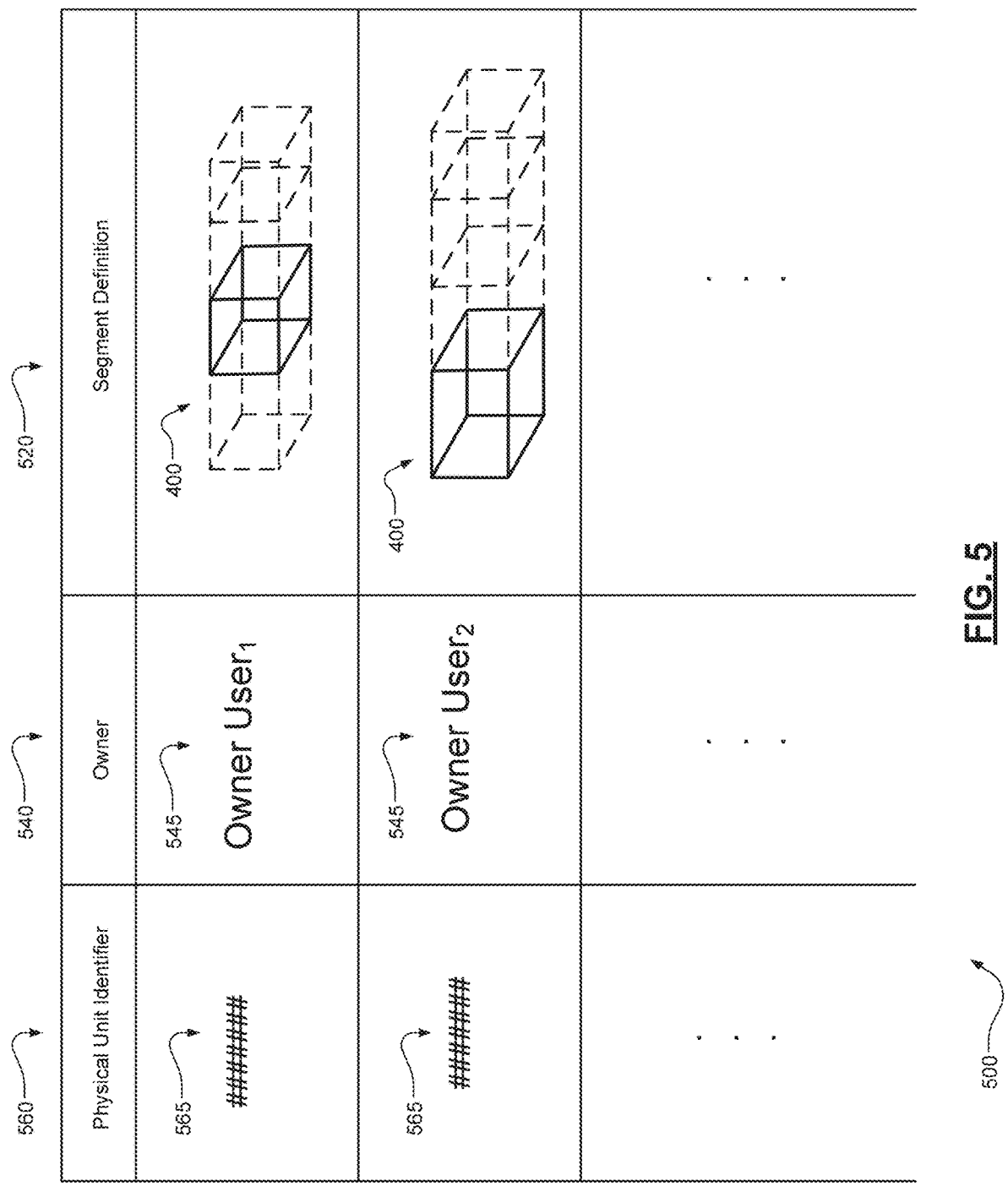
FIG. 5 is an example map that subdivides each of one or more physical units of a physical commodity into a plurality of segments according to some implementations of the present disclosure.

Referring to FIG. 5, in order to track the ownership interests of users, the dealer user 120 may utilize a map 500 (an allocation table, an ownership register, a ledger or collection of ledgers, or other record of ownership) that subdivides each of the one or more physical units 125-1, 125-2, . . . 125-*n* into a plurality of discrete, identifiable segments 310. The map 500 can be stored in the memory 250 (such as a database) of a computing device 200 associated with the dealer user 120. Alternatively, the map 500 can be in the control of one or more third party map operators, which can include the dealer user 120 and third party map operators. These third party map operator(s) can act to assign ownership of each of the plurality of segments in the map 500 based on instructions received from the dealer user 120. In this manner, the dealer user 120 can utilize the map 500 by sending one or more instructions to the third party map operator(s) to assign ownership of each of the plurality of segments 310 in the map 500.

In the example map 500 illustrated in FIG. 5, there is a segment definition portion 520, an ownership record portion 540, and a physical unit identifier portion 560. The segment definition portion 520 can include information (such as a representation 400) sufficient to describe one or more of the plurality of segments 310. The ownership record portion 540 associates either directly via a description 545 or indirectly the owner user 140 to one or more segments 310 defined by the segment definition portion 520. The physical unit identifier portion 560 can include information sufficient to identify the physical unit 125 associated with the segment 310, such as a serial number 565 or other identifying characteristic of the physical unit 125. It should be appreciated that the illustrated map 500 is one example, and other forms of the map 500 are within the scope of the present disclosure.

Figure 6:
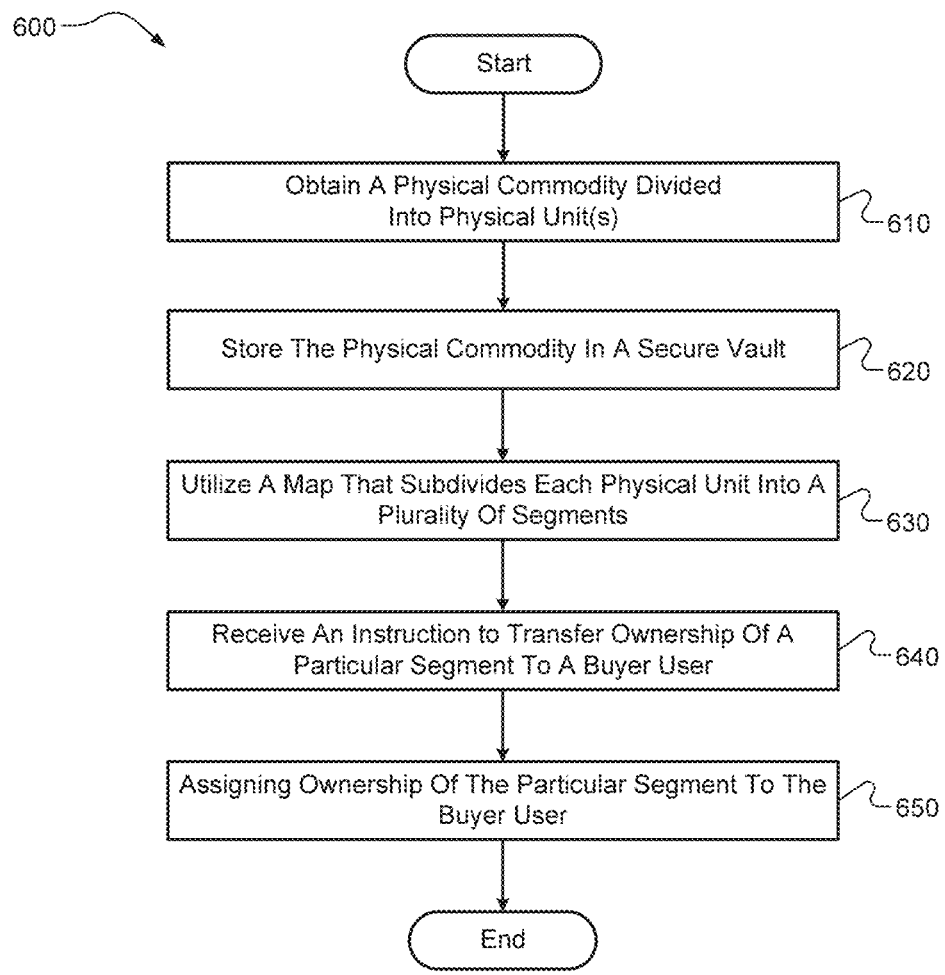
FIG. 6 is a flow diagram of an example method for transferring ownership of a segment of a physical unit of a physical commodity in accordance with some implementations of the present disclosure.

Referring now to FIG. 6, a flow diagram of an example method 600 for transferring ownership of a segment 310 of a physical unit 125-1, 125-2, . . . 125-*n* of a physical commodity 125 in accordance with some implementations of the present disclosure is illustrated. At 610, a physical commodity 125 that is divided into one or more physical units 125-1, 125-2, . . . 125-*n* can be obtained. At 620, the physical commodity 125 can be stored in a secure vault 130. A map 500 can be utilized at 630. The map 500 can subdivide each of the one or more physical units 125-1, 125-2, . . . 125-*n* into a plurality of segments 310, where each of the plurality of segments can be tangible portions of the physical unit that are distinct and identifiable. As described above, subdividing each of the one or more physical units 125-1, 125-2, . . . 125-*n* can render the physical units 125-1, 125-2, . . . 125-*n* unaltered. The map 500 can be utilized to assign ownership of each of the plurality of segments 310 to one or more owner users 140.

Furthermore, at 650, the method can also include receiving an instruction to transfer ownership of a particular segment 310 of the plurality of segments 310 from a particular owner user 140 to a buying user 160. Upon receiving the instruction, the method 600 can include assigning (at 660) in the map 500 ownership of the particular segment 310 to the buying user 160.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method implemented by computing device associated with a dealing entity to facilitate allocating portions of a precious metal, the dealing entity computing device having one or more processors and a memory, the method comprising:

obtaining by the dealing entity a quantity of a precious metal that is divided into one or more physical units having a three-dimensional form;

storing at least one of the one or more physical units of the precious metal in a secure vault, wherein the vault is located remotely from the dealing entity computing device;

receiving, at the dealing entity computing device, three-dimensional image data for the at least one physical unit, wherein the three-dimensional image data is generated by a scanning computing device in communication with the dealing entity computing device;

subdividing, at the dealing entity computing device and using a three-dimensional mathematical mapping of coordinates based on the physical unit, the three-dimensional image data for the at least one physical unit into a plurality of three-dimensional segments, each of the plurality of three-dimensional segments being associated with a tangible portion of the at least one physical unit that is distinct and identifiable, wherein subdividing the at least one physical unit renders the physical unit unaltered, and wherein the plurality of three-dimensional segments comprises the entire at least one physical unit;

storing, in the memory of the dealing entity computing device, the coordinates for the plurality of three-dimensional segments;

generating, at the dealing entity computing device and based on the coordinates, a specification for each of the plurality of segments based on the received three-dimensional image data for the at least one physical unit, each specification being: (i) associated with one of the plurality of segments, (ii) representative of its associated segment, and (iii) sufficient to generate a displayable representation of its associated segment such that the displayable representation can be displayed on a display of a user computing device in relation to its position with respect to an overall image of the at least one physical unit and with respect to the other of the plurality of segments that comprise the at least one physical unit;

generating, at the dealing entity computing device, a table of the specifications of the plurality of segments, each specification being associated in the table with an identifier of the at least one physical unit and a user to whom the segment is allocated by the dealing entity;

storing the table in the memory of the dealing entity computing device;

transmitting, by the dealing entity computing device and to a computing device associated with a first user, a first specification of a first segment associated with the first user;

receiving, at the dealing entity computing device, an instruction to allocate the first segment from the first user to a second user;

assigning, at the dealing entity computing device, in the table allocation of the first segment to the second user; and transmitting, from the dealing entity computing device, the first specification associated with the first segment to the second user, wherein the first specification is utilized to generate a first displayable representation of the first segment that is displayed in a graphical user interface of a second user computing device associated with the second user.

2. The method of claim 1, wherein storing the at least one of the one or more physical units in the secure vault comprises transferring the at least one of the one or more physical units to a third party vault owner.

3. The method of claim 1, wherein obtaining the precious metal comprises obtaining allocation of the precious metal, the precious metal being in physical custody of a third party.

4. The method of claim 1, wherein the specification of each particular segment is generated based on unique characteristics of the at least one physical unit, the unique characteristics including one or more of a physical refinery or mint stamp, a shape of the physical unit, a size of the physical unit, and a serial number associated with the physical unit.

5. The method of claim 1, wherein the physical units comprise at least one of bars, ingots, and coins.

6. The method of claim 1, wherein the table comprises information sufficient to define at least one of the plurality of segments, and information sufficient to identify allocation of at least one of the plurality of segments to a specific user of the first and second users.

7. The method of claim 1, wherein obtaining the precious metal comprises requesting a third party to obtain allocation of the precious metal.

8. A computing device associated with a dealing entity that has obtained a quantity of a precious metal that is divided into one or more physical units having a three-dimensional form, comprising:

one or more processors; and a non-transitory, computer readable medium storing instructions that, when executed by the one or more processors, cause the computing device to perform operations to facilitate allocating portions of a precious metal comprising:

receiving three-dimensional image data for at least one physical unit, wherein the three-dimensional image data is generated by a scanning computing device in communication with the dealing entity computing device, subdividing, using a three-dimensional mathematical mapping of coordinates based on the physical unit, the three-dimensional image data for the at least one physical unit into a plurality of three-dimensional segments, each of the plurality of three-dimensional segments being associated with a tangible portion of the at least one physical unit that is distinct and identifiable, wherein subdividing the at least one physical unit renders the physical unit unaltered, and wherein the plurality of three-dimensional segments comprises the entire at least one physical unit, storing the coordinates for the plurality of three-dimensional segments, generating, based on the coordinates, a specification for each of the plurality of segments based on the received three-dimensional image data for the at least one physical unit, each specification being: (i) associated with one of the plurality of segments, (ii) representative of its associated segment, and (iii) sufficient to generate a displayable representation of its associated segment such that the displayable representation can be displayed on a display of a user computing device in relation to its position with respect to an overall image of the at least one physical unit and with respect to the other of the plurality of segments that comprise the at least one physical unit, generating a table of the specifications of the plurality of segments, each specification being associated in the table with an identifier of the at least one physical unit and a user to whom the segment is allocated by the dealing entity, storing the table in the memory of the dealing entity computing device, transmitting, to a computing device associated with a first user, a first specification of a first segment associated with the first user, receiving an instruction to allocate the first segment from the first user to a second user, assigning in the table allocation of the first segment to the second user, and transmitting the first specification associated with the first segment to the second user, wherein the first specification is utilized to generate a first displayable representation of the first segment that is displayed in a graphical user interface of a second user computing device associated with the second user.

9. The computing device of claim 8, wherein the physical units comprise at least one of bars, ingots, and coins.

10. The computing device of claim 8, wherein the table comprises information sufficient to define at least one of the plurality of segments, and information sufficient to identify allocation of at least one of the plurality of segments to a specific user of the first and second users.

* * * * *